United States Patent
Gunnarsson et al.

(10) Patent No.: US 9,237,491 B2
(45) Date of Patent: Jan. 12, 2016

(54) METHOD AND DEVICE FOR A RELAY NODE

(71) Applicant: Telefonaktiebolaget L M Ericsson (publ), Stockholm (SE)

(72) Inventors: Fredrik Gunnarsson, Linköping (SE); Stefan Engström, Linköping (SE); Gunnar Mildh, Sollentuna (SE); Walter Müller, Upplands Väsby (SE); Robert Petersen, Linköping (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/321,052

(22) Filed: Jul. 1, 2014

(65) Prior Publication Data

US 2014/0364124 A1  Dec. 11, 2014

Related U.S. Application Data

(63) Continuation of application No. 13/704,419, filed as application No. PCT/SE2010/050711 on Jun. 22, 2010, now Pat. No. 8,811,998.

(51) Int. Cl.
| | |
|---|---|
| H04W 36/00 | (2009.01) |
| H04B 7/155 | (2006.01) |
| H04W 36/10 | (2009.01) |
| H04W 76/02 | (2009.01) |

(Continued)

(52) U.S. Cl.
CPC ....... *H04W 36/0061* (2013.01); *H04B 7/15528* (2013.01); *H04W 16/26* (2013.01); *H04W 36/00* (2013.01); *H04W 36/10* (2013.01); *H04W 76/021* (2013.01); *H04W 36/08* (2013.01); *H04W 36/16* (2013.01); *H04W 48/20* (2013.01); *H04W 84/045* (2013.01); *H04W 88/00* (2013.01); *H04W 88/04* (2013.01)

(58) Field of Classification Search
None
See application file for complete search history.

(56) References Cited

U.S. PATENT DOCUMENTS

| | | | |
|---|---|---|---|
| 2009/0310584 A1 | 12/2009 | Viorel et al. | |
| 2010/0273416 A1* | 10/2010 | Yi et al. | 455/9 |

FOREIGN PATENT DOCUMENTS

| | | |
|---|---|---|
| CN | 1531270 A | 9/2004 |
| CN | 101188816 A | 5/2008 |

(Continued)

OTHER PUBLICATIONS

Hu, H. et al. "Self-Configuration and Self-Optimization for LTE Networks." IEEE, Communications Magazine, Feb. 1, 2012, vol. 47, Issue 2, 94-100.

(Continued)

*Primary Examiner* — Suhail Khan
(74) *Attorney, Agent, or Firm* — Murphy, Bilak & Homiller, PLLC

(57) ABSTRACT

A relay node for a radio access network, arranged to be a relay node between one or more User Equipments in a cell of the radio access network and a base station serving the cell. The relay node is arranged to identify itself as a relay node in the cell in the radio access network, and is also arranged to receive a non-support indication indicating that the base station serving the cell is unable to support a relay node. The relay node is arranged to, upon receiving said non-support indication, attempt to establish itself as a relay node in another cell.

20 Claims, 8 Drawing Sheets

(51) Int. Cl.
*H04W 16/26* (2009.01)
*H04W 48/20* (2009.01)
*H04W 84/04* (2009.01)
*H04W 36/08* (2009.01)
*H04W 36/16* (2009.01)
*H04W 88/00* (2009.01)
*H04W 88/04* (2009.01)

(56) References Cited

FOREIGN PATENT DOCUMENTS

| CN | 101299832 A | 11/2008 |
|---|---|---|
| KR | 20100040646 A1 | 4/2010 |
| WO | 2010123322 A2 | 10/2010 |

OTHER PUBLICATIONS

Ueda, T. et al. "Dynamic Base Station Relocation in Dynamic Base Station Relocation in Cognitive Mesh Networks Using Packet Switch." Wireless Communications and Networking Conference, Mar. 31, 2008, pp. 2093-2098.

Unknown, Author, "Discussion on Access Control of Relay." 3GPP TSG-RAN WG2 Meeting #69, R2-101151, Feb. 22-26, 2010, San Francisco, USA. 1-2.

Unknown, Author, "ETSI TR 102 682 V1.1.1 (Jul. 2009)", Reconfigurable Radio Systems (RRS); Functional Architecture (FA) for the Management and Control of Reconfigurable Radio Systems. Jul. 2009. 1-45.

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.2.0, Sep. 2007, 1-109.

3GPP, "3rd Generation Partnership Project; Technical Specification Group Radio Access Network; Evolved Universal Terrestrial Radio Access (E-UTRA); Relay architectures for E-UTRA (LTE-Advanced) (Release 9)", 3GPP TR 36.806 V2.0.0, Feb. 2010, 1-34.

3GPP, "3rd Generation Partnership Project; Technical Specification Group Radio Access Network; Feasibility study for Further Advancements for E-UTRA (LTE-Advanced) (Release 9)", 3GPP TR 36.912 V9.2.0, Mar. 2010, 1-61.

3GPP, "3rd Generation Partnership Project; Technical Specification Group Services and System Aspects; Telecommunication management; Study on management of Evolved Universal Terrestrial Radio Access Network (E-UTRAN) and Evolved Packet Core (EPC) (Release 8)", 3GPP TR 32.816 V8.0.0, Dec. 2008, 1-38.

Unknown, Author, "Informative List of SON Use Cases", NGMN Project 12, Annex A (informative) of "Use Cases related to Self Organising Network. Overall Description.", Apr. 17, 2007, 1-36.

* cited by examiner

METHOD AND DEVICE FOR A RELAY NODE

RELATED APPLICATIONS

The present application is a continuation of U.S. patent application Ser. No. 13/704,419, filed 14 Dec. 2012, which is a national stage entry of International Application serial no. PCT/SE2010/050711, filed 22 Jun. 2010.

TECHNICAL FIELD

The present disclosure relates to a relay node for a radio access network, as well as to a network node and a method for operating a relay node in a radio access network.

BACKGROUND

One important aspect in wireless networks, in this case mobile telephony networks, is to ensure that the network is simple to deploy and cost efficient to operate. Preferably, the network should also be self-organizing in as many aspects as possible. Another aspect which is important to ensure is that the network has good coverage. One way of improving the coverage of a mobile telephony system is to use relay nodes, which serve as an "intermediate station" between mobile terminals in a cell of the system and the base station which serves the cell. Usually, the same technology is used both for user data between a mobile terminal and the relay node, and for the connection between the relay node and the base station.

A problem when deploying relay nodes in a mobile telephony network is that not all base stations in the network may be capable of supporting relay nodes.

Relay node support broadcasting from all base stations has been proposed to handle this problem, but a drawback to such a solution is it comprises rather costly signaling, which would only be needed when relay nodes are installed and powered on for the first time.

SUMMARY

A purpose of the present invention is to provide an improved solution to the problem of base stations which are not capable of supporting relay nodes.

This purpose is met by the present invention in that it discloses a relay node for a radio access network which is arranged to be a relay node between one or more User Equipments in a cell of the radio access network and a base station serving the cell.

The relay node is arranged to identify itself as a relay node in the cell in the radio access network, and is also arranged to receive a non-support indication indicating that the base station serving the cell is unable to support a relay node. In addition, the relay node is arranged to, upon receiving said non-support indication, attempt to establish itself as a relay node in another cell.

In one embodiment, the relay node is arranged to identify itself as a relay node in the cell by means of transmitting one or more connection messages as part of an initial connection procedure.

In one embodiment, the relay node is arranged to transmit the one or more connection messages to a separate configuration node in the radio access network or in a core network to which the radio access network is connected, and to receive the non-support indication and the additional information from the configuration node.

In one embodiment, the relay node is arranged to interpret an absence of response to the one or more connection messages as the non-support indication.

In one embodiment, the relay node is arranged to transmit the one or more connection messages as one or more of:
  A dedicated Radio Resource Control message,
  A dedicated establishment cause in an RRC Connection Request message,
  A dedicated indication in an RRC Connection Setup Complete message,
  A random access preamble, where the information about the proper random access preamble to use in the cell is transmitted by the base station serving the cell.

In one embodiment, the relay node is arranged to, receive, along with the non-support indication, additional information comprising one or more of:
  an indication of the reason why the base station serving the cell is unable to support relay nodes,
  an alternative carrier or frequency band intended for relay node communication,
  an alternative Radio Access technology (RAT) intended for relay node communication
  a list of one or more cells in which there is support for relay nodes,
  a list of one or more cells in which there isn't support for relay nodes.

In this embodiment, the relay node is arranged to use the additional information when attempting to establish itself as a relay node in another cell.

The notion of "a cell in which there is support for a relay node" is here used in the sense that the eNodeB which serves the cell supports relay nodes. A special case arises when the cell in which the relay node attempts to establish itself is already served by a relay node, so that one relay node attempts to connect to another relay node. In such a case, the cell will lack support for relay nodes, unless the relay node which serves the cell supports relay nodes, i.e., the serving relay node supports multi-hop relaying."

In one embodiment, the relay node is arranged to receive the list of one or more cells which support relay nodes, and/or the list of one or more cells which don't support relay nodes, in the form of one or more ranges of cell identifiers.

The invention also discloses a network node for a Radio Access Network or a Core Network, arranged to interact with a relay node of the invention, as well as a method for operating a relay node. The network node, the method, and the relay node, will be described in more detail in the detailed description given in this text.

BRIEF DESCRIPTION OF THE DRAWINGS

The invention will be described in more detail in the following, with reference to the appended drawings, in which.

DETAILED DESCRIPTION

Figure 1:
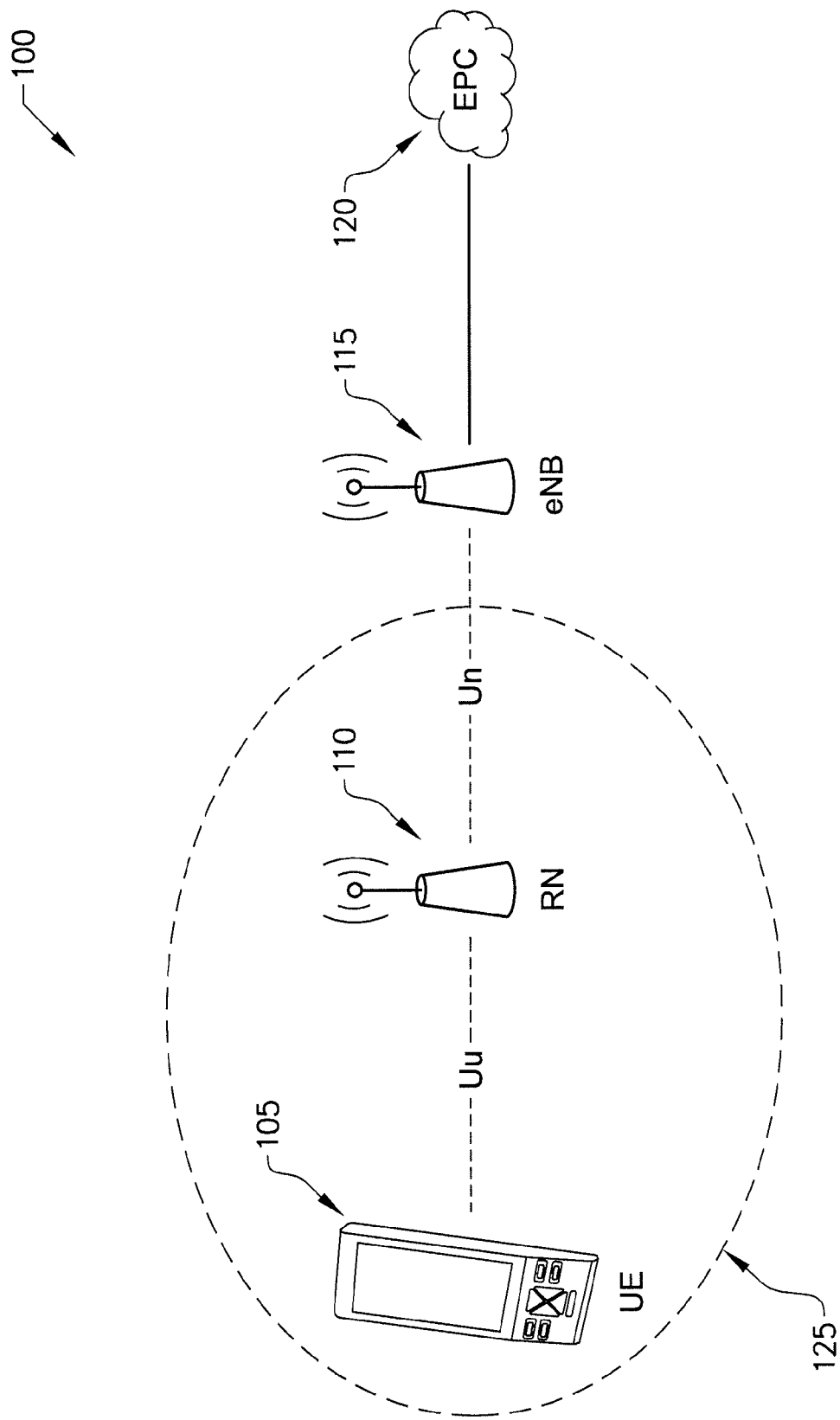
FIG. 1 shows a schematic view of use of a relay node of the invention.

FIG. 1 shows a schematic overview of a system 100 in which the invention is used. The system 100 as well as the invention as such will in the following be described using terminology from an LTE system, Long Term Evolution. It should be pointed out that this is merely by way of example, in order to facilitate the reader's understanding of the invention, and should not be used to restrict the scope of protection sought for or granted to the invention, which can also be used in other types of systems, such as for example, WCDMA and GSM systems.

The system 100 comprises one or more cells 125, each of which is served by a base station 115, which in an LTE system is known as an eNodeB. Each eNodeB can serve one or more cells such as the one 125, and is connected to a core network, in this example a so called EPC, Evolved Packet Core 130, by means of a plurality of intermediate nodes which are not shown in FIG. 1.

In each cell 125 there can be a plurality of User Equipments 105. In order to increase the coverage of the cell 125, the cell has been provided with a relay node 110, which connects one or more of the User Equipments (UEs) to the eNodeB 115. Suitably, the same kind of connection is used between the UEs and the relay node as between the relay node and the eNodeB.

In order to support relay nodes, the base stations need dedicated functionality. For eNodeBs in an LTE system, such functionality includes:
  S1 and X2 proxy functionality, which means that the S1 and X2 connections to/from the relay node and onwards are terminated and forwarded by the eNodeB serving the relay node,
  S11 termination, which means that secure tunnels can be established between the eNodeB and other nodes,
  Serving Gateway (S-GW) functionality, which is responsible for the user plane handling of connections served by the relay, instead of a S-GW in the core network,
  Dedicated physical layer and MAC layer signaling and procedures, depending on whether the relay node backhaul is in-band or out-band. In-band is here used to denote the case where the connection between the eNodeB and the relay node use the same frequency band as the connection between the eNodeB and the UEs in the cell, and out-band is here used to denote the case where the connection between the eNodeB and the relay node use another frequency band then the connection between the eNodeB and the UEs in the cell.

As mentioned previously, all eNodeBs in an LTE system may not be able to handle the function of a relay node, for example due to the fact that some eNodeBs may be older, and thus not be provided with the necessary functionality. Due to this fact, a relay node which attempts to establish itself as a relay node in a cell may not be able to do so successfully, if the cell is served by an eNodeB which does not support the function of a relay node.

By means of the present invention, a relay node which fails to establish itself in a cell will be notified that the failure is due to the fact that the eNodeB does not support relay nodes, which means that the relay node can avoid further unnecessary attempts at establishing itself in that particular cell, and can instead attempt to establish itself as a relay node in another cell.

Figure 2:
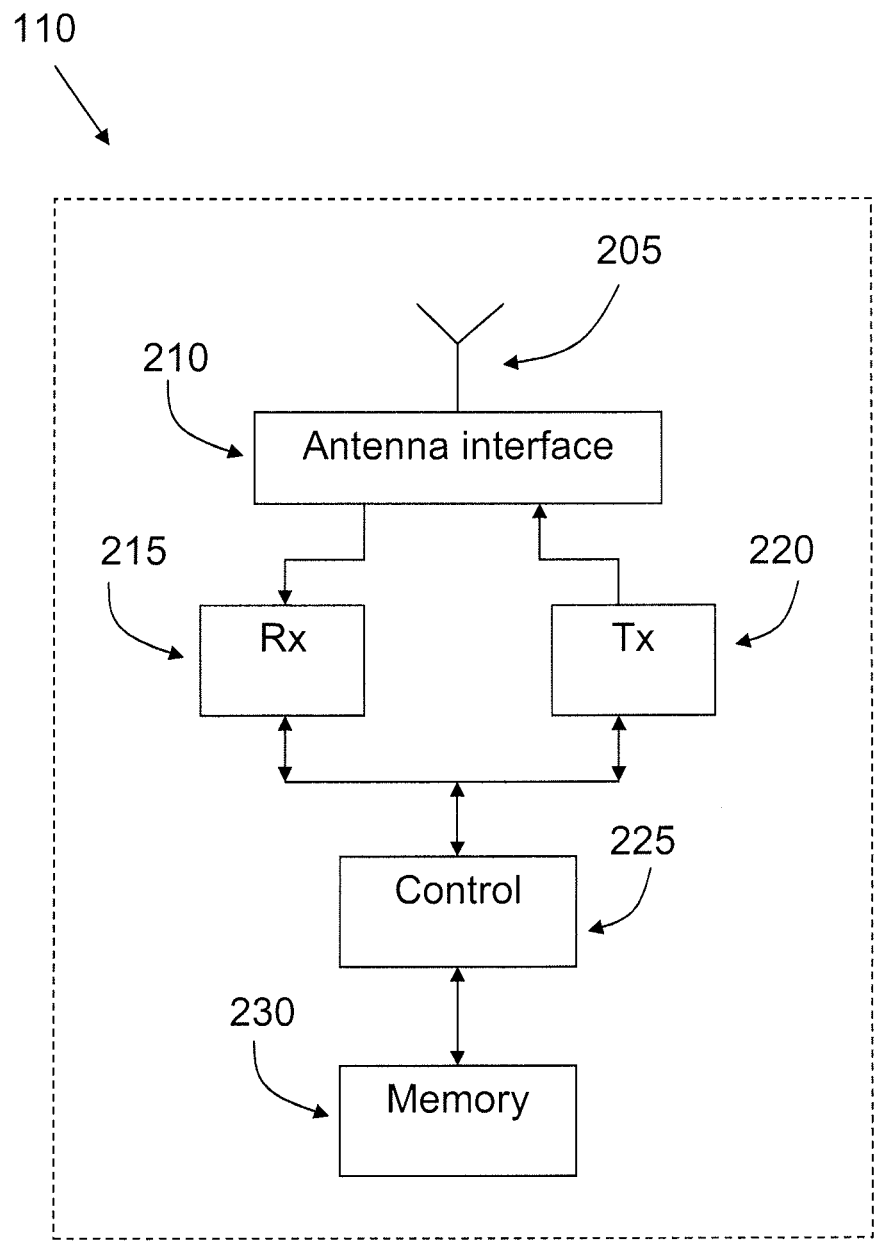
FIG. 2 shows a schematic block diagram of a relay node of the invention.

Before a description is given of the functionality of the relay node 110 of the invention in its various embodiments, a brief description of some of the major components of the relay node 100 will be given with reference to FIG. 2 which shows a schematic block diagram of the relay node 110:

As shown in FIG. 2, the relay node 110 comprises a receive unit Rx 215 and a transmit unit Tx 220. The transmit unit 220 and the receive unit 215 are connected to an antenna interface 210 which connects them to an antenna unit 205, by means of which they make transmissions to/receive transmissions from UEs in the cell 125 and the eNodeB 115.

The relay node 110 also comprises a control unit 225 for controlling the function of the relay node, including the functions of the transmit and receive units 220, 215. In addition, the relay node 110 also comprises a memory unit 230, connect to the control unit, for storing data for the operation of the relay node 110.

The relay node 110 is arranged to identify itself as a relay node in the cell 125 in the radio access network 100, and is also is arranged to receive a non-support indication indicating that the eNodeB 115 which serves the cell 125 is unable to support a relay node. Examples of the non-support indication will be described in more detail later in this text, but as the name implies, it is an indication which enables the relay node 100 to understand that the eNodeB 115 is unable to support a relay node. Along with the non-support indication, the relay node 110 is also, in one embodiment, arranged to receive additional information, which comprises one or more of the following:
  an indication of the reason why the base station 115 which serves the cell 125 is unable to support relay nodes,
  an alternative carrier or frequency band intended for relay node communication,
  an alternative Radio Access technology (RAT) intended for relay node communication,
  and/or a list of one or more cells in which there is support for relay nodes (white list),
  a list of one or more cells in which there isn't support for relay nodes.

Figure 3:
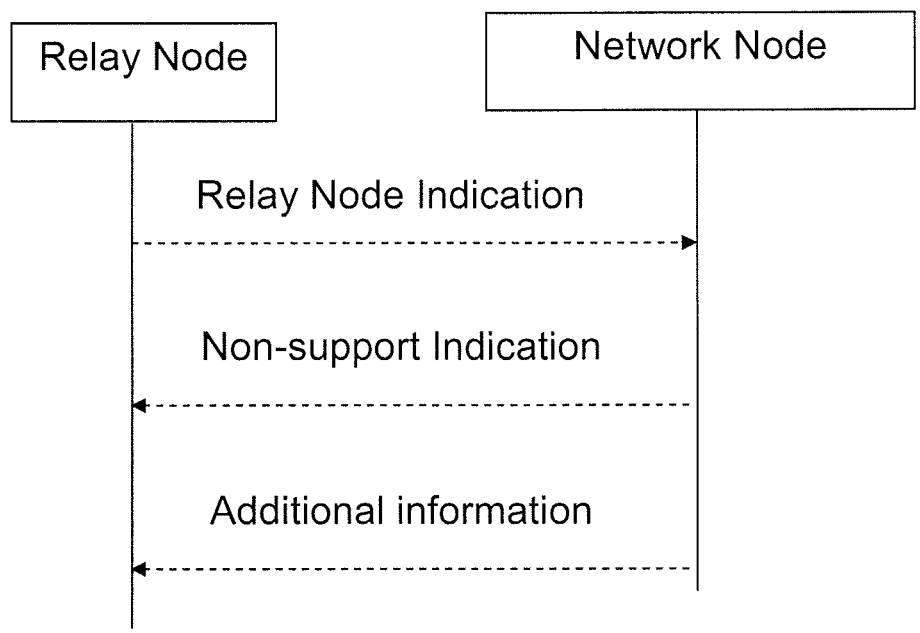
FIG. 3 shows a signaling diagram of one embodiment.

This is illustrated schematically in FIG. 3, which shows a relay node transmitting a relay node indication to a network node, such as for example, an eNodeB or a Mobility Management Entity (MME), and receiving a non-support indication and additional information in reply.

The indication of the reason why the base station 115 which serves the cell 125 is unable to support relay nodes may comprise such reasons as:
  No software support—the eNodeB software is not configured to handle relay nodes or the software version lack support to handle relay nodes,
  No S-GW functionality,
  No X2 and S1 proxy functionality,
  No S11 functionality,
  Relay node, no multi-hop support—the eNodeB is in fact a relay node itself and is therefore unable to support other relay nodes,
  Insufficient resources to support another relay node, typically because the eNodeB already handles the number of relay nodes that it is capable of.

In one embodiment, the relay node 110 is arranged to identify itself as a relay node in the cell 125 by means of transmitting one or more connection messages as part of an initial connection procedure.

In one embodiment, the relay node 110 performs an attach procedure as if it were an UE in the cell 125. Part of this procedure involves signaling a NAS message to the core network 120 together with information about the attaching UE. From this information, the core network will be able to disclose that the attaching UE is actually a relay node, and can inform the eNodeB 115 about this, i.e., that there is a relay node in the cell 125 which the eNodeB 115 serves.

In another embodiment, the relay node 110 is arranged to indicate directly to the eNodeB 115 that it is a relay node, for example via Radio Resource Control (RRC). In such an embodiment, the relay node 110 is arranged to transmit one or more connection messages to the eNodeB as one or more of:

A dedicated RRC message,

A dedicated establishment cause in an RRC Connection Request message,

A dedicated indication in an RRC Connection Setup Complete message,

A random access preamble, where the information about the proper random access preamble to use in the cell is transmitted by the base station serving the cell.

As mentioned, the relay node 100 is arranged to receive, along with the non-support indication, additional information which has been enumerated above.

The relay node 110 is arranged to attempt to establish itself as a relay node in another cell upon receiving the non-support indication. In one embodiment, the relay node uses the additional information which the relay node receives along with the non-support indication when the relay node attempts to establish itself as a relay node in another cell upon receiving the non-support indication.

In one embodiment, the relay node 110 stores the indication about relay node non-support and the additional information, in the embodiments in which the additional information is received, which can be used for future cell reselection decisions. For example, cells that are associated with another relay node will most likely not be supporting relay nodes in the future either. On the other hand, an eNodeB which lacks software support of relay nodes at one point in time might have been upgraded, and may be capable of handling relay nodes in the future.

In another embodiment, the relay node 110, upon learning that the eNodeB 115 does not support relays, is arranged to updates status information in a local management system of the relay node or the site. The changed status information can include error codes or other indications, such as lights, audio signals etc, which can be received by an operator's staff. The error codes can provide information about the reason why the relay node 110 could not attach as a relay to the current eNodeB 115.

In one embodiment, the relay node 110 is arranged to receive the list of one or more cells which support relay nodes, here also referred to as "white list cells", and/or the list of one or more cells which don't support relay nodes, here also referred to as "black list cells", in the form of one or more ranges of cell identifiers. The cell identifiers are, in one embodiment, the eight bit cell identifier of the E-UTRAN Cell Identifier. This notion will be explained with reference to FIG. 4, which shows the structure of an E-UTRAN Cell Identifier:

In LTE, cells are identified locally by a signal sequence from an enumerated set. In LTE there are 504 signal sequences, each associated to a Physical Cell Identity (PCI). Furthermore, a cell broadcasts an E-UTRAN Cell Identifier, a 28-bit cell identifier which identifies the cell within the Public Land Mobile Network (PLMN).

The cell identifiers used between eNodeBs are specified, as well as the cell identifiers used between an eNodeB and the core network. The 28 bit cell identifier is divided into two parts an eNodeB ID identifying the eNodeB; and cell identifiers of cells served by the eNodeB.

Figure 4:
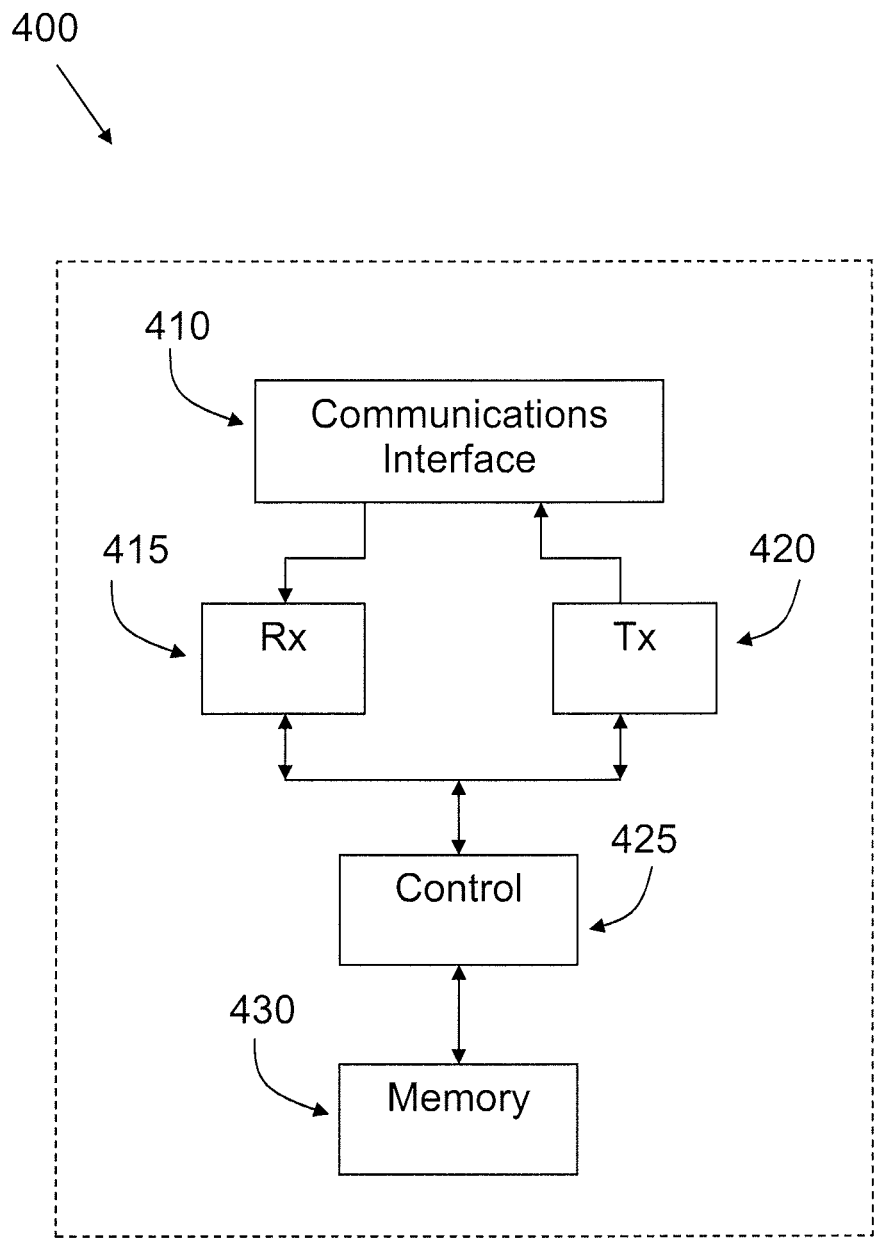
FIG. 4 shows a schematic block diagram of a network node of the invention.
Figure 5:
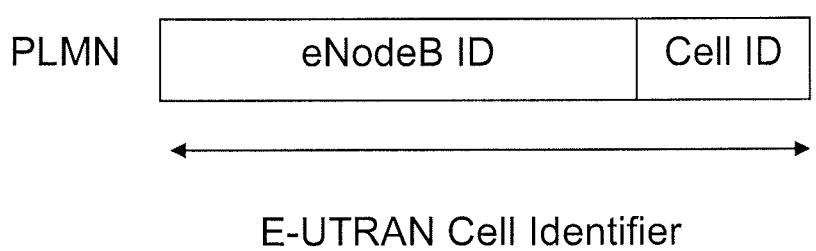
FIGS. 5-7 show different embodiments of how the relay node of the invention interfaces with other nodes.

In the case of a so called macro eNodeB the eNodeB ID comprises 20 bits, which leaves 8 bits to identify the cells, and in the case of a so called home eNodeB the eNodeB ID is identified by 28 bits, and can consequently only comprise one cell. FIG. 4 illustrates the relation between the Cell and eNo-deB identifiers. It is thus the cell identifiers which the relay node 110 is arranged to receive a range of as a "white" or a "black" cell list.

As mentioned, the relay node is arranged to identify itself as a relay node in the cell 125 in the radio access network. This identification is suitably carried out to a network node, either in the radio access network or in the core network. Three main cases can be discerned regarding the network node:

The network node is an LTE Mobility Management Entity (MME). Here, this is the MME which terminates the NAS (Non Access Stratum) signaling to the relay node, and which has an established S1 interface to the eNodeB serving the relay node.

The network node is the eNodeB 115 serving the relay node.

The network node is a special configuration node.

These cases will be described in more detail later in this text, since the invention also discloses a network node for a Radio Access Network or a Core Network, which network node can in various embodiments be one of the three nodes listed above. However, in the case of the network node being the eNodeB 115, the non-support indication which the relay node 110 is arranged to receive will be described in the following: in this case, a missing answer from the eNodeB 115 to a relay indication from the relay node 110 is interpreted by the eNodeB 110 as being an indication by the relay node that relay nodes are not supported by the serving eNodeB 115, i.e. the non-support indication.

In one such embodiment, the control unit 225 in the relay node 110 starts a timer at a pre-determined instant during an RRC connection establishment, and if the timer expires before the relay node 110 receives any signaling that only an eNodeB that supports relay nodes would send, this is interpreted by the control unit 225 of the relay node 110 as being the non-support indication.

In one embodiment, in which the relay node 100 is arranged to transmit its one or more connection messages to a separate configuration node in the radio access network or in a core network to which the radio access network is connected, the relay node 100 is arranged to receive the non-support indication and the additional information from the configuration node.

The invention also discloses a network node for a Radio Access Network or a Core Network. A schematic block diagram of such a network node is shown in FIG. 4. As will be realized, the network node 400 comprises many of the same generic components as the relay node 110. As shown in FIG. 4, the network node 400 comprises a receive unit Rx 415 and a transmit unit Tx 420. The transmit unit 420 and the receive unit 415 are intended to indicate units which are adapted to transmit and receive, respectively, messages in a wireless or wire-bound fashion, depending on the application. The transmit unit 420 and the receive unit 415 are connected to a communications interface 410, by means of which they communicate with other units, either wirelessly or via landlines, as the case may be.

The network node 400 also comprises a control unit 425 for controlling the function of the relay node, including the functions of the transmit and receive units 420, 415. In addition, the relay node 400 also comprises a memory unit 430, connect to the control unit, for storing data for the operation of the relay node 400.

The network node 400 is arranged to receive one or more messages as part of an initial connection procedure from a User Equipment 110 in a first cell such as the one 125 in FIG. 1, of a Radio Access Network.

The network node 400 is arranged to use the one or more messages to identify the User Equipment as a relay node 1110 in the first cell 125, and is also arranged to, upon identifying the User Equipment as a relay node 110, transmit a non-support indication to the relay node 110, indicating that a base station 115 which serves the first cell 125 does not support a relay node 110.

In one embodiment, the network node 400 is also arranged to transmit to the relay node 110 an indication of the reason that the base station 115 serving the first cell does not support a relay node 110.

In one embodiment, the network node 400 is also arranged to transmit to the relay node 110 one or more of the following along with the non-support indication:
 An alternative carrier or frequency band intended for relay node communications,
 An alternative Radio Access Technology intended for relay node communications,
 A list of cells which support relay nodes,
 A list of cells which don't support for relay nodes.

In one such embodiment, the network node is arranged to transmit the list of cells and/or base stations as a dedicated set of cell identifiers, such as the cell identifier part of the E-UTRAN Cell Identifier, i.e. the "white" and "black" cell lists mentioned previously comprise a dedicated set of cell identifiers.

In one embodiment, the network node 400 is an LTE MME, and the initial connection procedure of which the one or more messages from the UE are part of is an Attach Procedure.

In one embodiment in which the network node 400 is an MME, the MME is equipped with a list of eNodeBs in the Radio Access Network 100 which support or do not support a relay node 110, and the MME bases the non-support indication to the relay node 110 upon this list, with the non-support indication being an Attach Reject via NAS signaling.

In one embodiment in which the network node 400 is an MME, the MME is arranged to signal a relay node indication to the eNodeB 115 regarding a specific UE served by the eNodeB 115, in this case the "UE" 110, and to receive a negative indication from the eNodeB 115 indicating that the eNodeB does not support the function of a relay node. In this embodiment, the MMME 400 is arranged to then send an Attach Reject to the relay node 110 via the eNodeB 115. The negative indication from the eNodeB 115 will suitably be a protocol error or a dedicated relay node non-support message.

Figure 6:
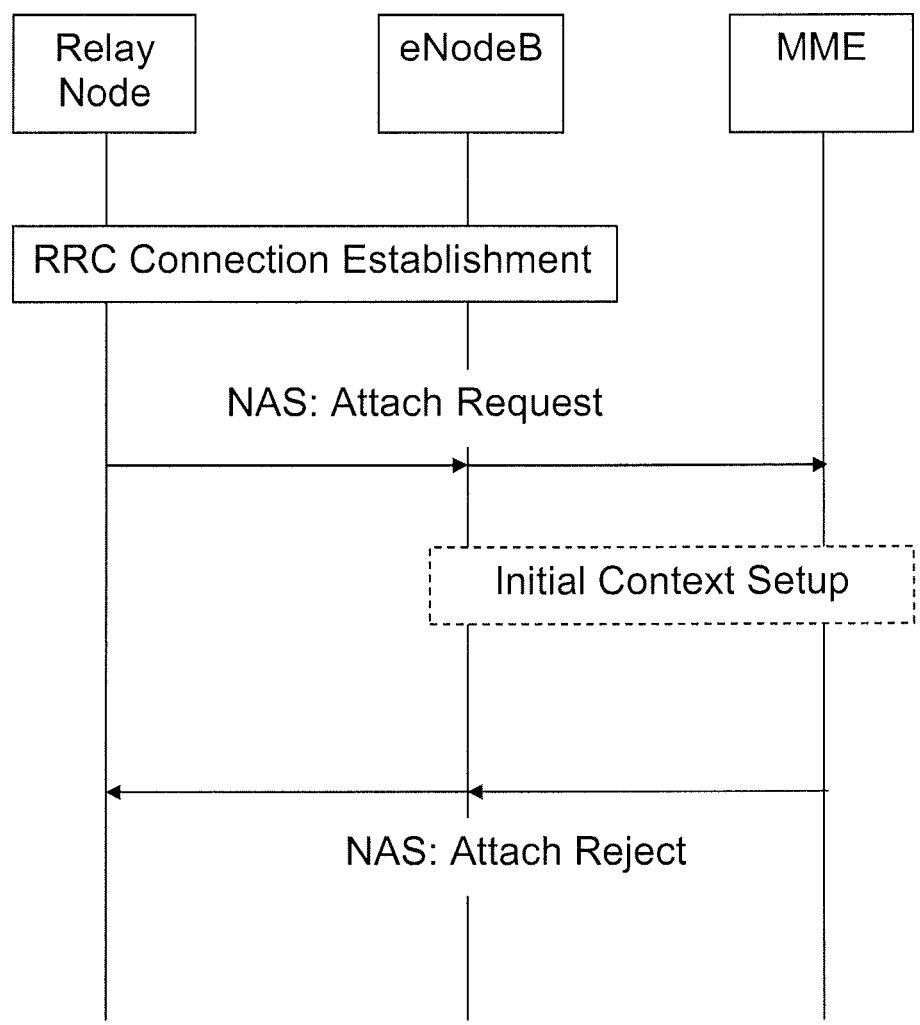

The case in which the network node is an LTE MME is also schematically illustrated in FIG. 6: the relay node 110 performs an RRC Connection establishment to the eNodeB 115, following which the relay node 110 transmits an NAS Attach Request to the MME 400. In one case the MME already knows that the eNodeB 115 does not support relay nodes, in which case the MME can immediately reply with a NAS Attach Reject. Alternatively, the RRC Connection establishment is followed by the NAS Attach Request and there is an Initial Context Setup between the eNodeB 115 and the MME 400, following which the MME 400 transmits the NAS Attach Reject to the relay node 100 via the eNodeB 115.

In one embodiment, the network node 400 is an LTE eNodeB, such as the one 115 in FIG. 1, and is arranged to transmit the non-support indication to the relay node 110 as one or more of:
 A dedicated RRC message,
 A proprietary message,
 A dedicated Release Cause for the RRC Connection Release,
 An RRC Connection Reject message In one embodiment, the network node is a separate configuration node for either the radio access network or the core network, which is arranged to receive the one or more messages which are part of an initial connection procedure from the User Equipment 110 during a connection procedure to the configuration node in which the User Equipment 110 transmits information about itself to the configuration node. The information that the relay node transmits about itself to the configuration node comprises such information, as, for example, the relay node identity, SIM details of the relay node, serving eNodeB information such as the E-UTRAN cell identifier, PCI, tracking area codes, relay node capabilities, software version, its estimated location information, the relay node IMSI, IMEI, etc.

In general, the embodiment in which the network node is a configuration node in the core network functions will be described in the following. It should be noted that the case in which the configuration node is placed in the radio access network functions in a similar manner.

The relay node 110 establishes connectivity with the core network 120 via the attach procedures. The relay node 110 discloses or obtains the address of the configuration node 400, i.e. a core network node dedicated at least in part to providing relay nodes with initial configuration information, and signals an indication to this configuration node as part of a connection procedure to the configuration node, which connection procedure has been described above, the indication comprising the information listed above.

The configuration node 400 then indicates to the relay node 110 whether the eNodeB 115 supports relay nodes or not. If the eNodeB 115 does not support relay nodes, the configuration node 400 may provide reselection information as described in previously, for example:
 An alternative carrier or frequency band intended for relay node communications,
 An alternative Radio Access Technology intended for relay node communications,
 A list of cells which support relay nodes,
 A list of cells which don't support for relay nodes.

The configuration node may be configured based on neighbor cell relation information, as well as relay node support capabilities of different cells and eNodeBs, and the configuration can be carried out manually or automatically by the Domain Manager.

In the relay node's procedure of obtaining connectivity with the core network, the MME may have disclosed that the eNodeB 115 lacks relay node support. If a configuration node such as the one disclosed here is present, the MME instead signals "attach accept" to the relay node 110 to enable the relay node 110 to maintain connectivity with the network. In one embodiment, the MME also signals connectivity information such as, for example, an IP address of the configuration node, or information about the configuration node that can be used to derive the IP address of the configuration node.

Figure 7:
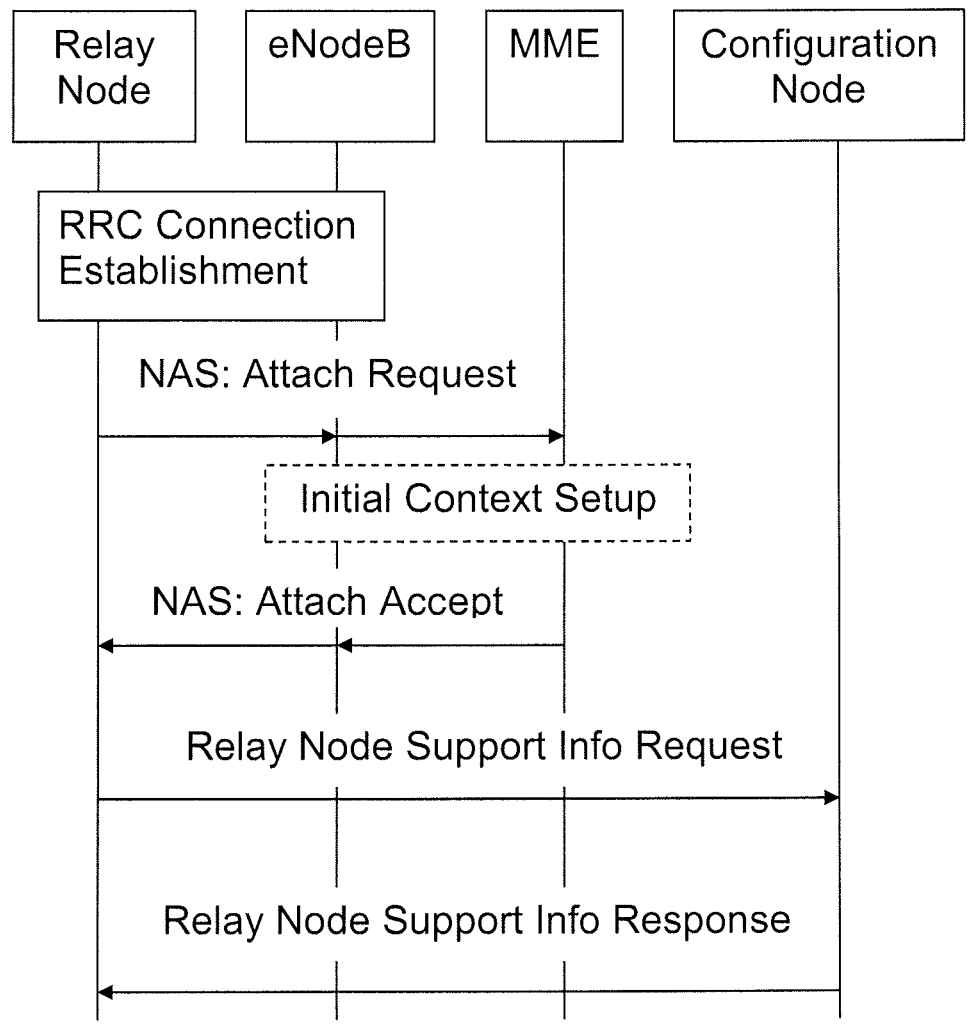

The signaling in the case when the network node is a separate configuration node is shown in FIG. 7: what is shown here is that the MME although it already when the relay node attaches to the network knows that the eNodeB 115 does not support relay nodes. However, the MME still accepts the attach request from the relay node in order to enable the relay node to establish contact with the configuration node.

Figure 8:
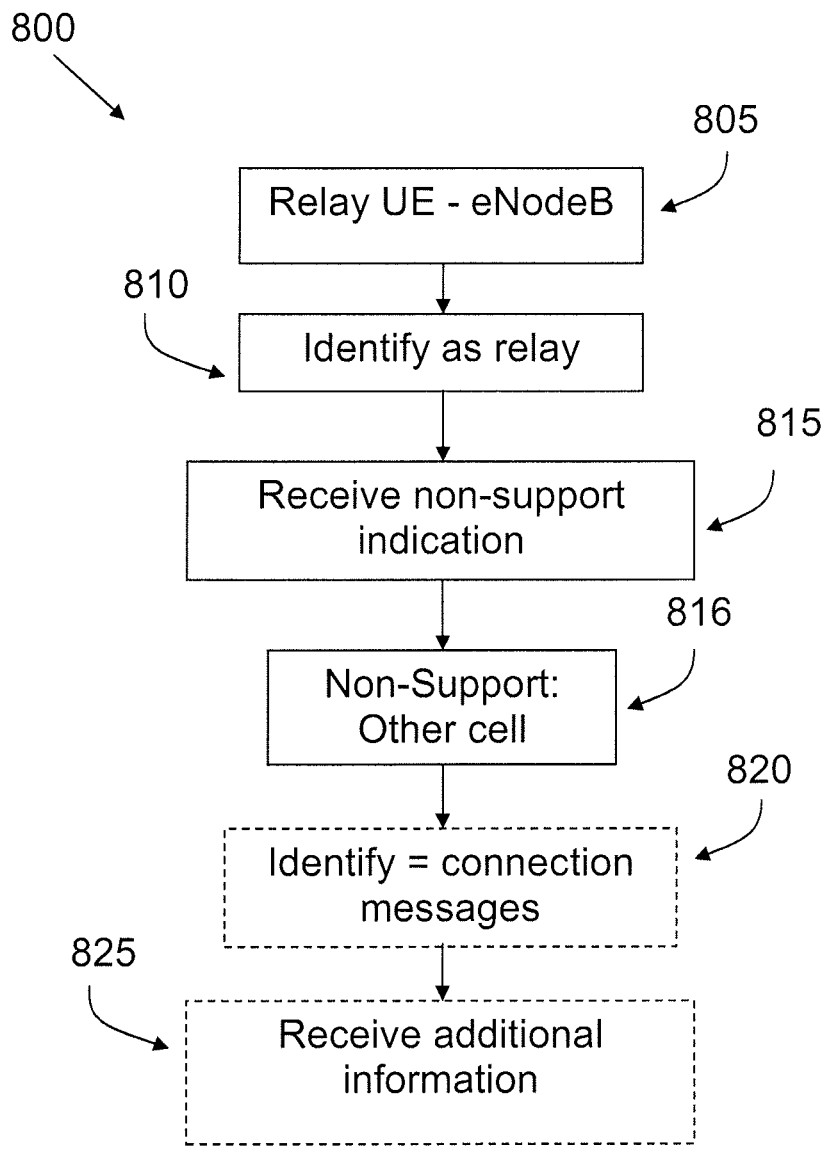
FIG. 8 shows a schematic flow chart of a method of the invention.

The invention also discloses a method for operating a relay node. A schematic flow chart of this method 800 is shown in FIG. 8, in which steps which are options or alternatives are shown with dashed lines.

The method comprises operating, step 805, a relay node in a radio access network as a relay node between one or more User Equipments in a cell of the radio access network and a base station serving the cell.

The method 800 further comprises, step 810, arranging the relay node to identify itself as a relay node in the cell in the radio access network (100), and also comprises receiving, step 815, in the relay node a non-support indication indicating that the base station serving the cell is unable to support a relay node, and upon receiving the non-support indication in the relay node, letting the relay node attempt to establish itself, step 816, as a relay node in another cell.

In one embodiment, as indicated in step 820, the method 800 additionally comprises transmitting from the relay node one or more connection messages as part of an initial connection procedure, in order to let the relay node identify itself as a relay node in the cell in the radio access network.

In one embodiment, as indicated in step 825, the method comprises, receiving, along with the non-support indication, additional information, comprising one or more of:
- an indication of the reason why the base station serving the cell is unable to support relay nodes,
- an alternative carrier or frequency band intended for relay node communication,
- an alternative Radio Access technology, RAT, intended for relay node communication
- a list of one or more cells in which there is support for relay nodes,
- a list of one or more cells in which there isn't support for relay nodes, and using this additional information in the relay node's attempt to establish itself as a relay node in another cell.

The invention is not limited to the examples of embodiments described above and shown in the drawings, but may be freely varied within the scope of the appended claims. For example, as mentioned previously, the invention is also applicable in such systems as WCDMA and GSM. In the WCDMA case, the network node can be a Radio Network Controller, RNC or a NodeB, while in the GSM case the network node can be the Base Station Controller, BSC, or the Base Transceiver Station, BTS. In both cases, i.e. in both the WCDMA and the GSM case, the network node can either be a Mobile Switching Centre, MSC, a Serving GPRS Support Node, SGSN, or a Gateway GPRS Support Node, GGSN.

What is claimed is:

1. A network node for a Radio Access Network or a Core Network, comprising:
   a receive unit;
   a transmit unit; and
   a control unit, wherein the control unit is configured to:
      receive one or more messages, using the receive unit, as part of an initial connection procedure from a User Equipment in a first cell of the Radio Access Network;
      identify the User Equipment as a relay node in said first cell, using the received one or more messages;
      transmit a non-support indication to the relay node, using the transmit unit, upon identifying the User Equipment as a relay node, indicating that a base station that serves said first cell does not support a relay node; and
      transmit to the relay node, using the transmit unit, upon the identifying the User Equipment as a relay node, one or more of:
         an alternative carrier or frequency band intended for relay node communications;
         an alternative Radio Access Technology intended for relay node communications;
         a list of one or more cells in which there is support for relay nodes; and
         a list of one or more cells in which there is not support for relay nodes.

2. The network node of claim 1, wherein the control unit is further configured to transmit, using the transmit unit, to the relay node an indication of the reason that the base station serving the first cell does not support a relay node.

3. The network node of claim 2, wherein the control unit is configured to transmit to the relay node the list of one or more cells which support relay nodes or the list of one or more cells which do not support relay nodes or both as a dedicated set of cell identifiers, such as a cell identifier part of a E-UTRAN Cell Identifier.

4. The network node of claim 3, wherein the network node is an LTE Mobility Management Entity in which the initial connection procedure is an Attach Procedure.

5. The network node of claim 4, wherein the network node is equipped with a list of eNodeBs in the Radio Access Network which support or do not support a relay node; and wherein the control unit of the network node bases the non-support indication to the relay node upon the list of eNodeBs, said indication being an Attach Reject.

6. The network node of claim 5, wherein the control unit is configured to:
   signal a relay node indication, using the transmit unit, to an eNodeB regarding a specific User Equipment served by the eNodeB; and
   receive a negative indication, using the receive unit, from the eNodeB, indicating that the eNodeB does not support a relay node and to then send an Attach Reject, using the transmit unit, to the relay node via said eNodeB.

7. The network node of claim 6, wherein the negative indication from the eNodeB is a protocol error or a dedicated relay node non-support message.

8. The network node of claim 1, wherein the network node is an LTE eNodeB, and wherein the non-support indication comprises one or more of:
   a dedicated RRC message;
   a proprietary message;
   a dedicated Release Cause for the RRC Connection Release; and
   an RRC Connection Reject message.

9. The network node of claim 1, wherein the network node is a separate configuration node for either the radio access network or the core network, configured to receive the one or more messages as part of an initial connection procedure, during a connection procedure in which the User Equipment transmits information about itself to the configuration node, said information including an identification that the User Equipment is a relay node.

10. The network node of claim 9, wherein the network node is configured to receive from the User Equipment in the initial connection procedure one or more of the following:
   tracking area information;
   the ID of the base station of the cell of the relay node;
   the cell global identifier of the cell of the relay node;
   the relay node's estimated spatial position;
   a relay node identifier;
   a relay node IMSI; and
   a relay node IMEI.

11. A method in a network node of a Radio Access Network or a Core Network, comprising:
   receiving one or more messages as part of an initial connection procedure from a User Equipment in a first cell of the Radio Access Network;

identifying the User Equipment as a relay node in said first cell, using the received one or more messages;

transmitting a non-support indication to the relay node upon identifying the User Equipment as a relay node, indicating that a base station that serves said first cell does not support a relay node, and transmitting to the relay node, upon the identifying the User Equipment as a relay node, one or more of:
  an alternative carrier or frequency band intended for relay node communications;
  an alternative Radio Access Technology intended for relay node communications;
  a list of one or more cells in which there is support for relay nodes; and
  a list of one or more cells in which there is not support for relay nodes.

12. The method of claim 11, wherein the transmitting to the relay node comprises transmitting to the relay node an indication of the reason that the base station serving the first cell does not support a relay node.

13. The method of claim 12, wherein the transmitting to the relay node comprises transmitting the list of one or more cells which support relay nodes or the list of one or more cells which do not support relay nodes or both as a dedicated set of cell identifiers, such as a cell identifier part of a E-UTRAN Cell Identifier.

14. The method of claim 13, wherein the network node is an LTE Mobility Management Entity in which the initial connection procedure is an Attach Procedure.

15. The method of claim 14, wherein the network node is equipped with a list of eNodeBs in the Radio Access Network which support or do not support a relay node, and wherein the method further comprises basing the non-support indication to the relay node upon the list of eNodeBs, said indication being an Attach Reject.

16. The method of claim 15, further comprising:
  signaling a relay node indication to an eNodeB regarding a specific User Equipment served by the eNodeB;
  receiving a negative indication from the eNodeB, indicating that the eNodeB does not support a relay node; and
  sending an Attach Reject to the relay node via said eNodeB.

17. The method of claim 16, wherein the negative indication from the eNodeB is a protocol error or a dedicated relay node non-support message.

18. The method of claim 11, wherein the network node is an LTE eNodeB, and wherein the non-support indication comprises one or more of:
  a dedicated RRC message;
  a proprietary message;
  a dedicated Release Cause for the RRC Connection Release; and
  an RRC Connection Reject message.

19. The method of claim 11, wherein the network node is a separate configuration node for either the radio access network or the core network, and wherein the receiving comprises, during a connection procedure in which the User Equipment transmits information about itself to the configuration node, said information including an identification that the User Equipment is a relay node.

20. The method of claim 19, wherein the receiving comprises receiving one or more of the following:
  tracking area information;
  the ID of the base station of the cell of the relay node;
  the cell global identifier of the cell of the relay node;
  the relay node's estimated spatial position;
  a relay node identifier;
  a relay node IMSI; and
  a relay node IMEI.

* * * * *